Patented May 19, 1931

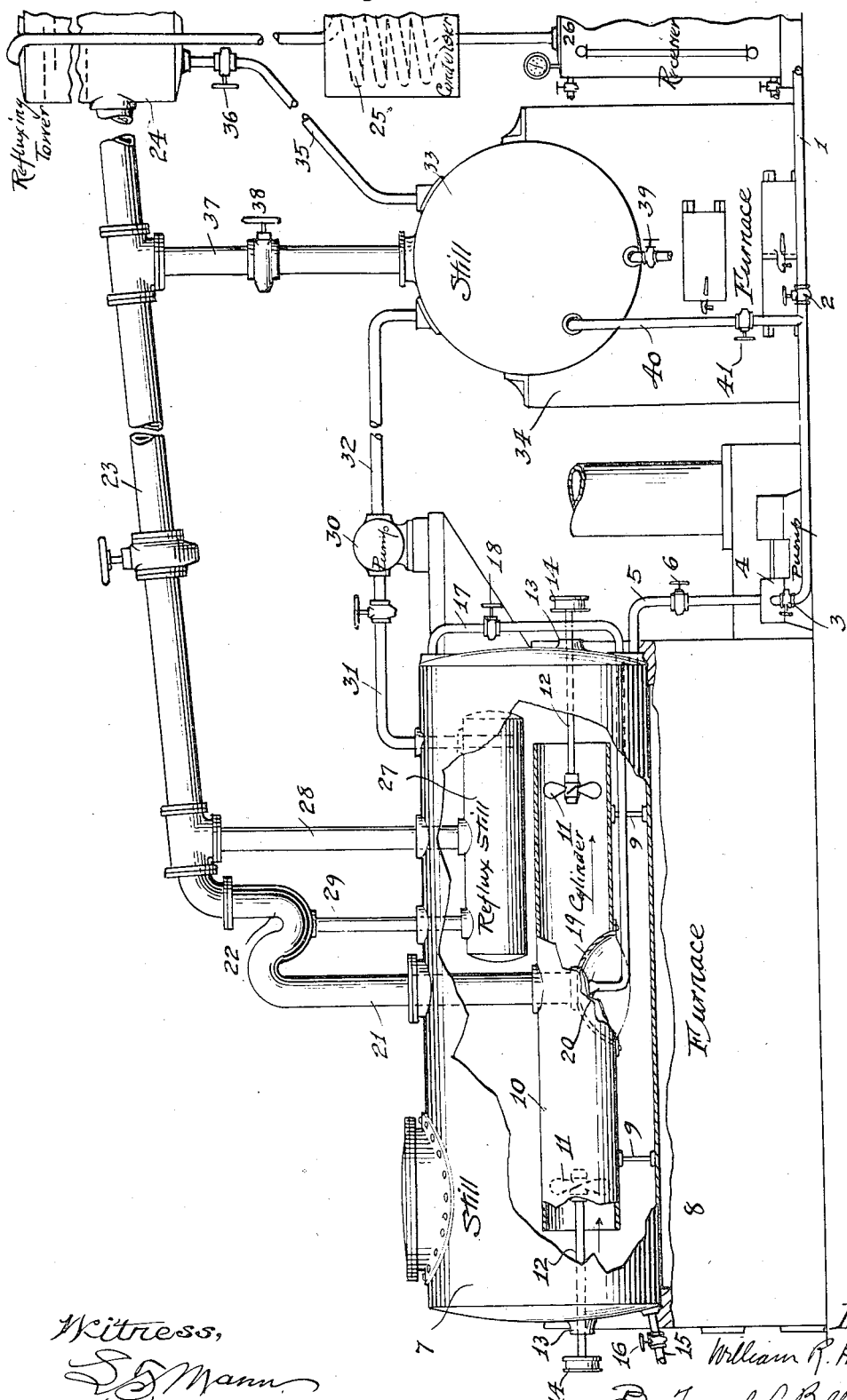

1,806,060

UNITED STATES PATENT OFFICE

WILLIAM R. HOWARD, OF WASHINGTON, DISTRICT OF COLUMBIA, ASSIGNOR TO UNIVERSAL OIL PRODUCTS COMPANY, OF CHICAGO, ILLINOIS, A CORPORATION OF SOUTH DAKOTA

APPARATUS FOR CONVERTING PETROLEUM OIL

Application filed December 27, 1921, Serial No. 525,094. Renewed March 3, 1927.

This invention relates to an apparatus for converting petroleum oil and refers more particularly to a process in which hydrocarbon oil is relieved of its lower boiling point fractions which are vaporized and condensed separately as distillate. The invention has to do with the treatment of oils in a still in which the oil is mechanically circulated in order that a more thorough and uniform treatment will be produced and the free carbon which is separated out during conversion will be kept in suspension due to the circulation and agitation of the oil during treatment. A further feature of the invention is the returning and separately retreating of the reflux condensate in a separate closed still mounted in the conversion chamber or retort.

The single figure is a side elevational view of the apparatus with parts broken away and parts in section to show the details of construction. In operation the oil is introduced from storage through the line 1 controlled by valves 2 and 3 and is charged by means of pump 4 through the line 5 regulated by a valve 6 to the still 7. This still is mounted above a furnace 8. The oil in the still is raised to a temperature at which substantial conversion of the oil takes place. During this conversion a pressure of the generated vapors is maintained upon the oil body in the still or retort 7. Within the still is mounted upon small standards 9 and open at both ends hollow cylinder 10 in both ends of which are positioned propellers 11 which are mounted upon the shafts 12 supported in stuffing box bearings 13 in each end of the still. On the outer extremities of the shafts 12 are pulleys 14 which are driven from any suitable source of power to rotate the propellers within the hollow cylinder so that an oil circulation will be produced within the cylinder in the direction of the arrows. The oil being introduced into the bottom of the still through the line 5 tends to sweep along the bottom or the hottest portion of the still or retort beneath the open ended cylinder 10. It is picked up by the circulation caused by the propeller blades at the opposite end of the retort and crosses through the open ended cylinder, thus being thoroughly intermixed in the oil body and kept in rapid circulation during heating. From time to time or continuously, according to the rate of reaction, the heavier or residuum oil may be drawn off through the line 15 controlled by a valve 16. The vapors evolved in the retort pass off through the line 17 controlled by a valve 18 and are introduced into a small dome 19 formed in the bottom of the hollow cylinder by means of the upturned end of the pipe 17 which is doubled back into the bottom of the retort, and terminates in an upstanding nozzle 20. The vapors are thus forced to pass through the oil body which will stand at a given level in the vapor line 21 which connects to the top of the dome 19. The vapors from the nozzle proceed through the vapor line up through the trap 22 formed therein and thence through the line 23 to the refluxing tower 24 where the reflux condensate is separated from the vapors, the uncondensed vapors passing off to the condenser 25 and thence to the receiver 26 where they are collected as liquid distillate. The reflux condensate which is separated out in the vapor line 23 will gravitate back and collect in the closed still 27 through lines 28 and 29, the trap 22 preventing any of the condensate from returning to the still 7. The condensate collecting in the reflux still 27 will be further converted, the vapors passing off through the line 28, and any excess unvaporized oil being pumped from the still 27 by means of the suction pump 30 and connecting lines 31 and 32 to the still 33 which is mounted above the furnace 34. This still is supplied both from the reflux still 27 mounted in the larger retort 7 and also from the dephlegmator by means of a draw-off line 35 controlled by a valve 36. In the still 33 the returned condensate which is of a more refractory character, is subjected to temperature and pressure conditions sufficient to produce further conversion, the vapors evolved therein, rising through the line 37 controlled by a valve 38, and combining with the vapors in the line 23, which flow to the dephlegmator 24 and thus are refluxed and condensed therewith. The oil which is unvaporized in the still 33 may be drawn off through the valve 39 or directed back into the charging line 2 through the line 40 controlled by a valve 41.

The agitation and circulation of the oil during treatment in the retort or still 7 prevents any appreciable accumulation of free carbon upon the bottom of the still and permits the operating of the apparatus for a considerably longer period of time.

A second feature of importance and one that has a substantial effect upon the character of the vapors which pass off is the fact that the vapors before rising into the vapor line, must pass through the oil body, thus relieving said vapors of certain deleterious substances by the purifying treatment exerted thereon by the liquid oil and serving to keep the vapors at a very hot and constant temperature so that certain vaporized ends will not tend to condense by the withdrawal of the vapors from the cool upper part of the still 7 through the line 17.

The advantage of returning and separately retreating the reflux condensate, relieves the still of retreating an oil which is objectionable due to the fact that it is more difficult to crack upon retreatment than the raw oil which is being charged to the still. To retreat such oil it is necessary to increase the temperature conditions to a point where conditions of conversion in the main body of the oil are increased to an objectionable state. An increase of the temperature conditions necessary to produce conversion in this reflux condensate will cause an objectionable amount of free carbon to be separated from the raw oil charge, while where the oil is treated separately as in the hereinbefore explained process, the temperatures in the main still may be maintained more uniform.

A further advantage of the process is the fact that by returning the reflux to a separate retort for retreatment, the main oil charge loses but a small portion of its viscosity and therefore, is more desirable for lubricating stock. Where the refluxed condensate is returned and mixed with the stock it tends to reduce the gravity or have a cutting-back effect which reduces materially its lubricating properties and makes it less desirable to be treated later for lubricating oil. By treating gas oil of approximately 30 to 32° B. under a pressure ranging from 100 to 200 pounds and temperature 750 to 900° F. in the heating zone, a high grade distillate of from 40 to 60% of the oil charge may be obtained, having a gravity of from 48 to 52° B.

I claim as my invention:

1. In an apparatus for converting hydrocarbon oils, the combination with a main still, a reflux still therein, of dephlegmating and condensing means connected to the main still by a vapor line, means for causing the vapors evolved in the main still to pass through the oil body prior to their introduction to the vapor line, and means for returning condensate from the vapor line to said reflux still disposed within the main still, a separate still for retreating the returned reflux condensate delivered thereto from the reflux still, means for continuously supplying oil to the still, and means for retaining a vapor pressure upon the system.

2. In an apparatus for converting hydrocarbon oil, the combination with a main still where oil is subjected to cracking conditions of temperature and pressure, of a reflux condenser in communication with the main still, an auxiliary reflux still adapted to be heated by oil in said main still, means for returning reflux condensate to said auxiliary still, an independent still and a communication between said independent still and said reflux still for introducing reflux condensate from said reflux still to said independent still, and vapor outlets in communication with said reflux condenser from said reflux still and said independent still.

3. In an apparatus for converting hydrocarbon oil, the combination with a main still where oil is subjected to cracking conditions of temperature and pressure, of a reflux condenser in communication with the main still, an auxiliary reflux still adapted to be heated by oil in said main still, means for returning reflux condensate to said auxiliary still, an independent still and a communication between said independent still and said reflux still for introducing reflux condensate from said reflux still to said independent still, and vapor outlets in communication with said reflux condenser from said reflux still and said independent still, in combination with means in the main still for creating a circulation of the oil therein.

4. An apparatus for cracking hydrocarbon oil comprising a primary still, refluxing means associated with said still adapted to separate a plurality of cuts of reflux condensate from vapors evolved in said still, means for passing one of said cuts of reflux condensate in heat interchange relation with the oil in said primary still, an independent still, means for passing another cut of the reflux condensate to said independent still, and means for delivering to said independent still reflux condensate which has been passed in heat interchange relationship with the oil in the primary still.

5. An apparatus for cracking hydrocarbon oil comprising a primary still, refluxing means associated with said still adapted to separate a plurality of cuts of reflux condensate from vapors evolved in said still, means for passing one of said cuts of reflux condensate in heat interchange relation with the oil in said primary still, an independent still, means for passing another cut of the reflux condensate to said independent still, means for delivering to said independent still reflux condensate which has been passed in heat interchange relationship with the oil in the primary still, and means for maintaining a higher pressure in the independent still than in said primary still.

WILLIAM R. HOWARD.